(12) United States Patent
Ito

(10) Patent No.: US 8,189,234 B2
(45) Date of Patent: May 29, 2012

(54) IMAGE PROCESSING APPARATUS, IMAGE PROCESSING METHOD, AND COMPUTER-READABLE RECORDING MEDIUM STORING IMAGE PROCESSING PROGRAM

(75) Inventor: Takanori Ito, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 766 days.

(21) Appl. No.: 12/314,401

(22) Filed: Dec. 10, 2008

(65) Prior Publication Data

US 2009/0153906 A1 Jun. 18, 2009

(30) Foreign Application Priority Data

Dec. 13, 2007 (JP) ................................ 2007-322319

(51) Int. Cl.
*H04N 1/40* (2006.01)
(52) U.S. Cl. ........................ 358/2.1; 358/509; 358/475
(58) Field of Classification Search .................. 358/1.9, 358/2.1, 474–475, 500, 504, 509–510, 512, 358/515–520, 527, 400, 406, 468
See application file for complete search history.

(56) References Cited

U.S. PATENT DOCUMENTS

| 4,843,458 | A | 6/1989 | Ito |
| 4,979,129 | A | 12/1990 | Okubo et al. |
| 4,985,759 | A | 1/1991 | Ito |
| 4,989,079 | A | 1/1991 | Ito |
| 4,989,080 | A | 1/1991 | Ito |
| 5,155,587 | A | 10/1992 | Itoh |
| 5,255,353 | A | 10/1993 | Itoh |
| 5,835,242 | A | 11/1998 | Itoh |
| 5,999,645 | A | 12/1999 | Ito |
| 2003/0210395 | A1 | 11/2003 | Takahashi et al. |
| 2007/0053009 | A1 | 3/2007 | Ito et al. |
| 2007/0070405 | A1 | 3/2007 | Murakata et al. |

FOREIGN PATENT DOCUMENTS

| JP | 11-275376 | 10/1999 |
| JP | 2002-077660 | 3/2002 |
| JP | 2003-153015 | 5/2003 |
| JP | 2003-333355 | 11/2003 |
| JP | 2005-311446 | 11/2005 |
| JP | 2007-208788 | 8/2007 |

OTHER PUBLICATIONS

Office Action issued Dec. 7, 2011, in corresponding Japanese Patent Application No. 2007-322319.

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image processing apparatus is disclosed. In the image processing apparatus, a vector converting section converts image data output from a color scanner into vector coefficients, and a color mapping section converts the image data, which are converted into the vector coefficients, into L kinds of record image data corresponding to color materials which are used by a color printer, by referring to an M-dimensional LUT (lookup table). In the M-dimensional LUT, record image data optimal under plural observing light sources have been stored corresponding to the image data converted into the vector coefficients.

20 Claims, 8 Drawing Sheets

FIG.5
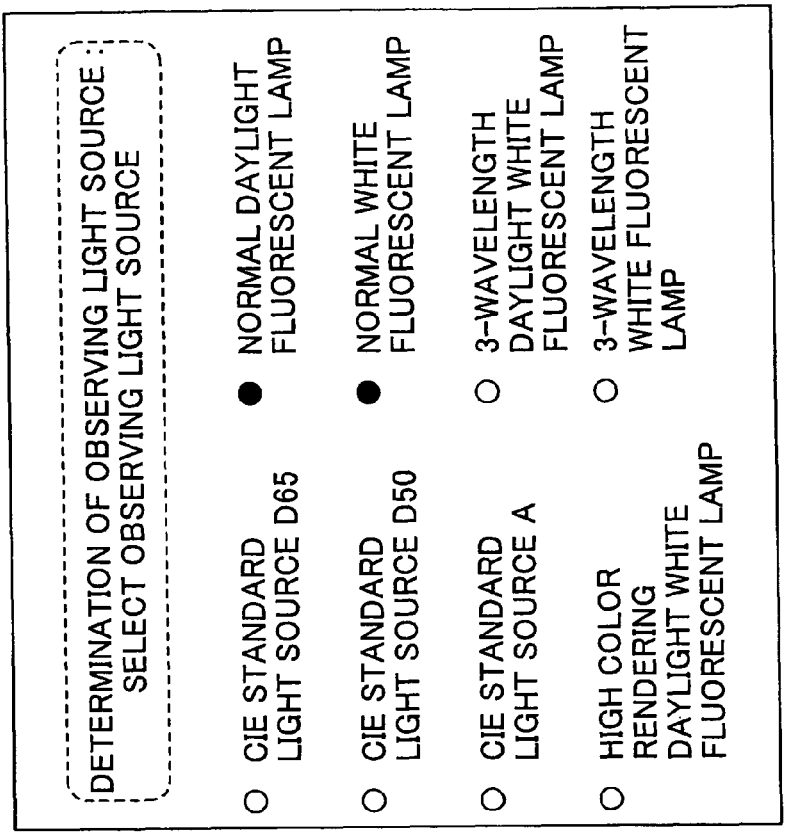
(a)
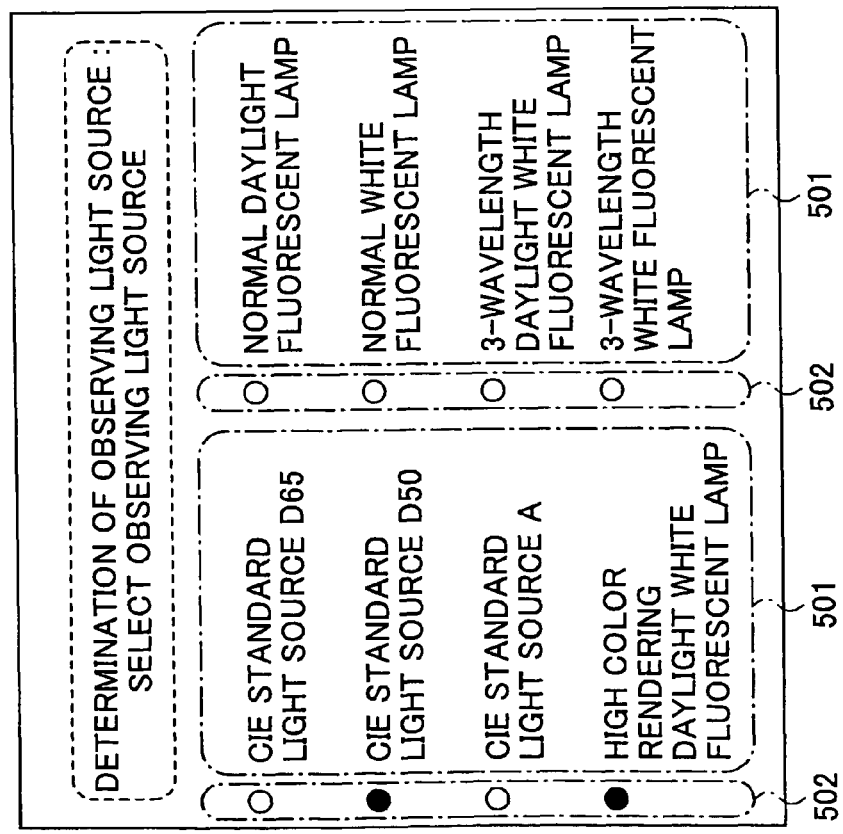
(b)

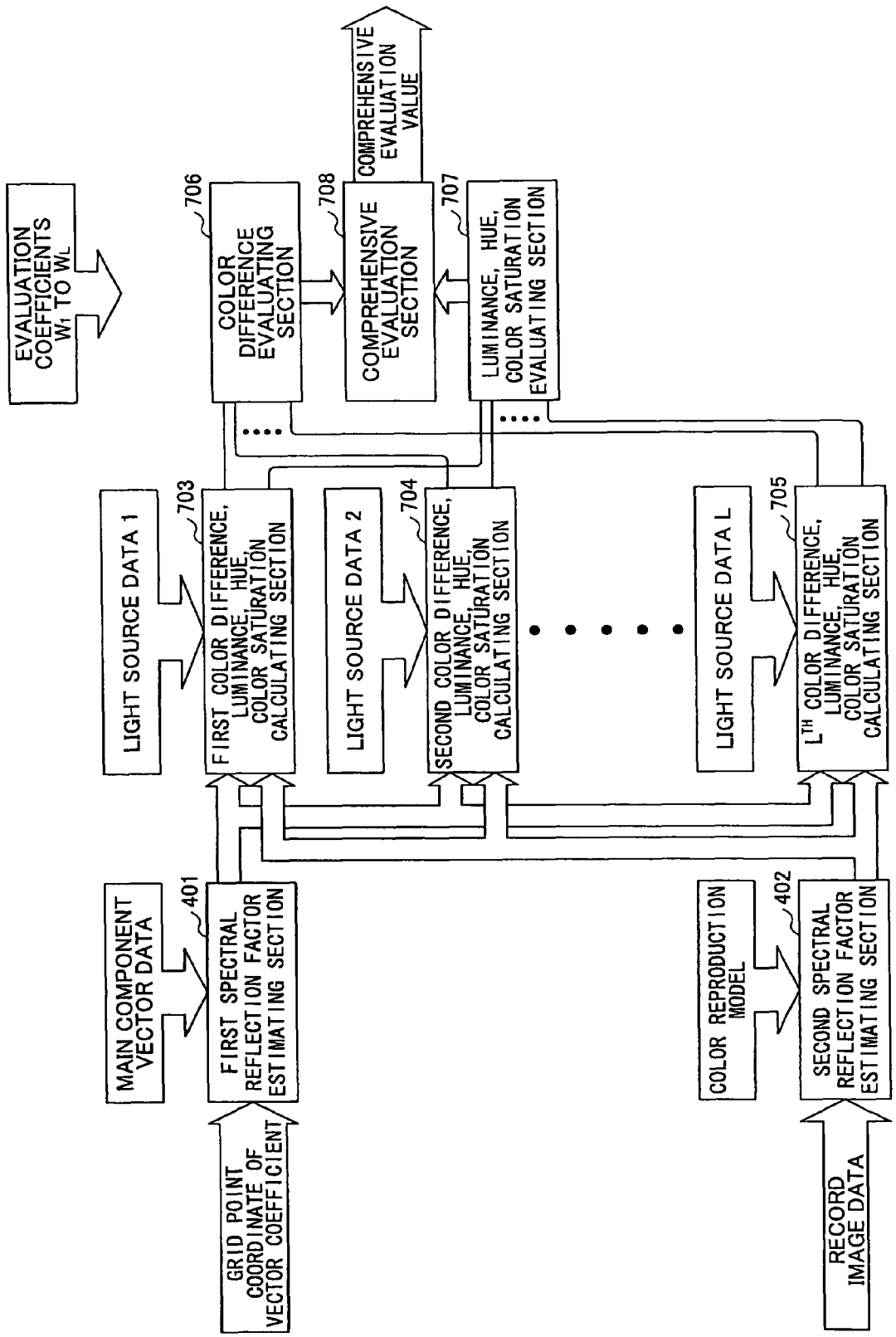

IMAGE PROCESSING APPARATUS, IMAGE PROCESSING METHOD, AND COMPUTER-READABLE RECORDING MEDIUM STORING IMAGE PROCESSING PROGRAM

BACKGROUND OF THE INVENTION

1. Field of the Invention

The present invention generally relates to an image processing apparatus, an image processing method, and a computer-readable recording medium storing an image processing program in which a color of a reproduced image is approximated to an original color of an original manuscript image when the reproduced image is observed.

2. Description of the Related Art

When a hard copy is observed, a perceived color of the hard copy is influenced by a spectral distribution of a light source which lights the hard copy. The spectral distribution of the light source which lights the hard copy is changed depending on conditions such as the place and the time of the observation. In order to reduce the influence from the light source, the spectral reflection factor of the hard copy is optimized (for example, see Patent Document 1).

When a reproduction image near an original manuscript image is desired to be formed, the original manuscript image is influenced by the light source; therefore, the method in Patent Document 1 is not suitable. That is, in this case, it is desirable that the spectral reflection factors of the original manuscript image and the reproduced image be the same.

In order to achieve the above, in Patent Document 2, the spectral distributions of the reproduction apparatus and the original document forming apparatus are compared, and a signal value of the reproduction apparatus is obtained when an error evaluation function is minimized. In this method, when the spectral reflection factors of the original manuscript image and the reproduced image are the same, the color to be perceived becomes equal under all kinds of the light sources.

[Patent Document 1] Japanese Laid-Open Patent Application Publication No. 2003-153015

[Patent Document 2] Japanese Laid-Open Patent Application Publication No. H11-275376

In a specific case where an original manuscript image and a reproduction image are formed by one apparatus, the spectral reflection factors of the original manuscript image and the reproduced image can be the same. However, in other cases, it is very difficult for the spectral reflection factors of the original manuscript image and the reproduced image to be made the same, and the color to be perceived may be different between the original manuscript image and the reproduced image depending on the light sources of the different apparatuses.

SUMMARY OF THE INVENTION

In a preferred embodiment of the present invention, there is provided an image processing apparatus, an image processing method, and a computer-readable recording medium storing an image processing program in which a color of a reproduced image to be perceived can be made to approximate an original color of an original manuscript image when a light source to light the reproduced image is changed from a light source to light the original manuscript image even if a spectral reflection factor of the reproduced image cannot be the same as the spectral reflection factor of the original manuscript image.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image processing method, and a computer-readable recording medium storing an image processing program particularly pointed out in the specification in such full, clear, concise, and exact terms so as to enable a person having ordinary skill in the art to practice the invention.

To achieve one or more of these and other advantages, according to one aspect of the present invention, there is provided an image processing apparatus. The image processing apparatus includes an input unit which inputs image data of a manuscript image by reading the manuscript image with use of N (N≧4) kinds of spectral sensitivity characteristics, a converting unit which converts the image data into record image data formed of L (L≧4) kinds of components, an output unit which outputs a record image based on the record image data, a light source determining unit which determines a plurality of light sources under which the manuscript image and the record image are observed, and a control unit which converts the image data into optimal record image data based on color differences between the manuscript image and the record image under the determined plural light sources under which the manuscript image and the record image are observed.

EFFECT OF THE INVENTION

According to an embodiment of the present invention, in an image processing apparatus, even if a spectral reflection factor of a reproduced image cannot be the same as a spectral reflection factor of an original manuscript image, since a color of the reproduced image to be perceived can be optimal when a light source to light the reproduced image is changed, the color of the reproduced image to be perceived can be made to approximate an original color of an original manuscript image.

BRIEF DESCRIPTION OF THE DRAWINGS

Features and advantages of the present invention will become more apparent from the following detailed description when read in conjunction with the accompanying drawings, in which:

FIG. 5 is a diagram showing screens for determining an observing light source on a display shown in FIG. 2 according to the first embodiment of the present invention;

FIG. 8 is a diagram showing a process structure of the comprehensive evaluation shown in FIG. 3 according to a fourth embodiment of the present invention.

DESCRIPTION OF THE PREFERRED EMBODIMENTS

Best Mode of Carrying Out the Invention

The best mode of carrying out the present invention is described with reference to the accompanying drawings.

First Embodiment

Figure 1:
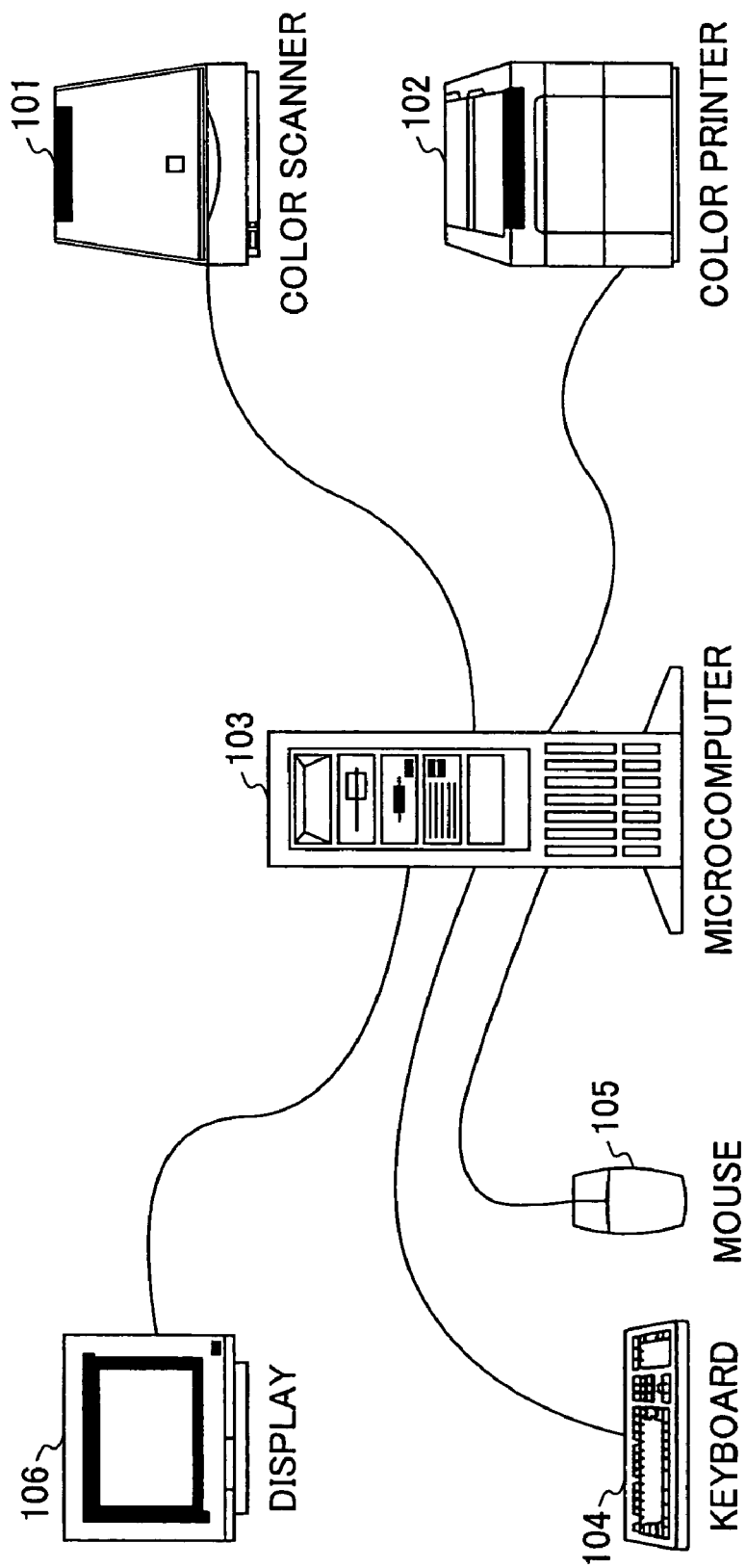
FIG. 1 is a structural diagram showing an image processing apparatus according to a first embodiment of the present invention.

FIG. 1 is a structural diagram showing an image processing apparatus according to a first embodiment of the present invention. In FIG. 1, a color scanner 101 reads a manuscript image by using N (N≧4) kinds of spectral sensitivity characteristics and outputs read image data. A general purpose color scanner reads a manuscript image by three primary colors such as RGB based on trichroic color perception of a person; however, the color scanner 101 reads the manuscript image by four or more kinds of the spectral sensitivity characteristics so as to estimate a spectral reflection factor of the manuscript image. In this case, when the number of the kinds of the spectral sensitivity characteristics is increased, the spectral reflection factor of the manuscript image can be accurately estimated; however, when the number of the kinds of the spectral sensitivity characteristics is increased, the structure of the image processing apparatus becomes complex and the amount of data to be processed is increased. Therefore, generally, the number of the kinds of the spectral sensitivity characteristics is approximately nine at the most. In the following, in the embodiment of the present invention, a case is described where the number of the kinds of the spectral sensitivity characteristics is six.

In FIG. 1, a color printer 102 outputs a recording image on a recording sheet (paper) by using L (L≧4) kinds of color materials (for example, ink or toners). The recording image can be output by using three kinds of the color materials based on the trichroic color perception of the person; however, generally, four kinds of color materials of CMYK are used. Therefore, in the following, the four kinds of color materials of CMYK are used. However, in the embodiment of the present invention, the number of the kinds of the color materials is not limited to four. When the number of the kinds of the color materials is five or more, a color can be recorded by using many combinations of the color materials. Therefore, when the spectral reflection factor is desired to be accurately obtained, the number of the kinds of the color materials is five or more.

A microcomputer 103 processes, for example, the image data output from the color scanner 101 and causes the color printer 102 to record the processed image data on a recording sheet. A keyboard 104, a mouse 105, and a display 106 are connected to the microcomputer 103. A user instructs the microcomputer 103 to perform operations by using the keyboard 104 and the mouse 105. The display 106 displays a candidate of the operations to be instructed by the user, an operated result of the microcomputer 103, and so on.

Figure 2:
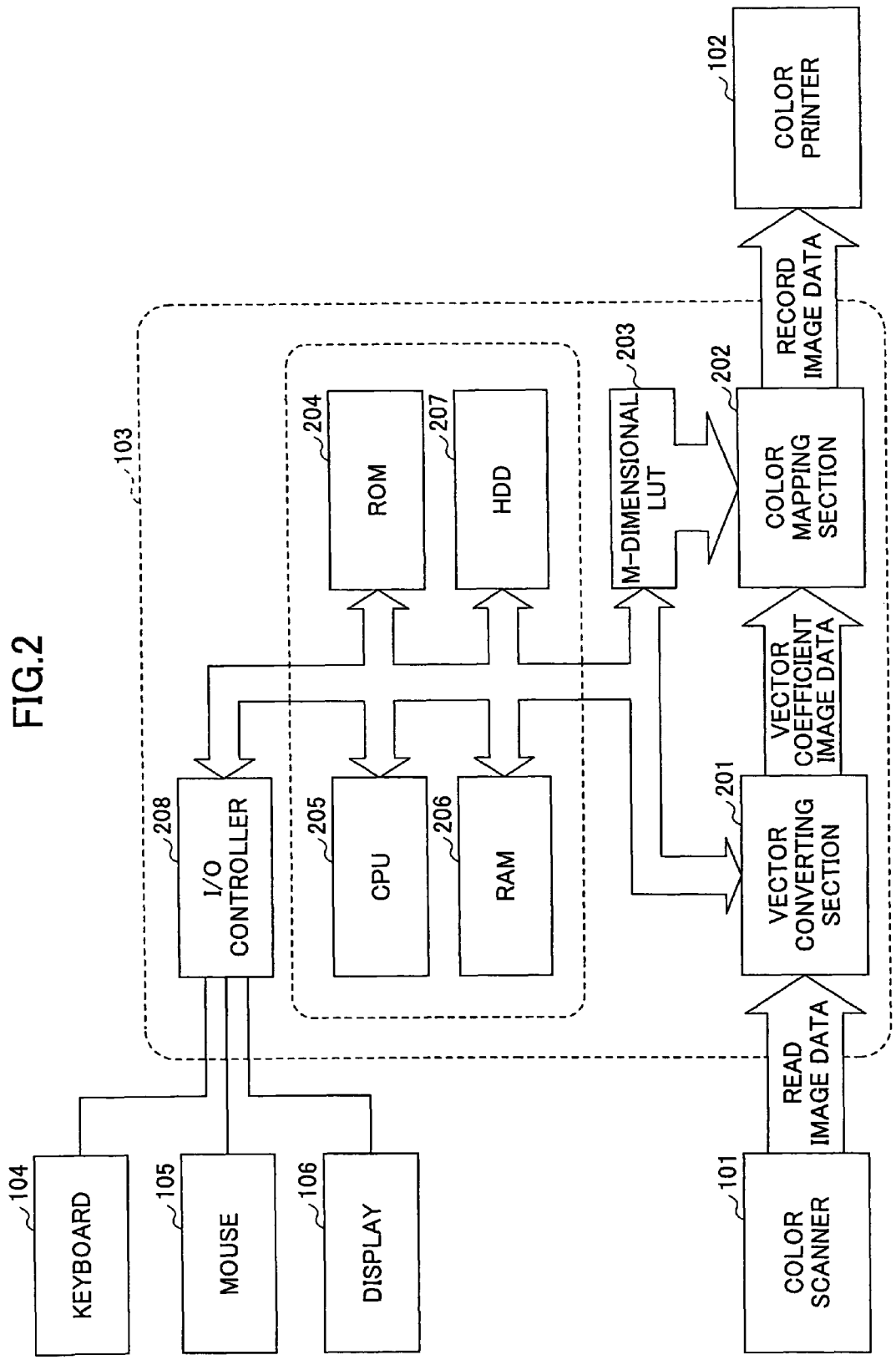
FIG. 2 is a block diagram showing the image processing apparatus according to the first embodiment of the present invention in which a microcomputer is shown in detail.

FIG. 2 is a block diagram showing the image processing apparatus shown in FIG. 1 in which the microcomputer 103 is shown in detail. As shown in FIG. 2, the image data output from the color scanner 101 are input to a vector converting section 201 of the microcomputer 103.

Generally, the following is well known. When many images to be read as manuscript images are collected and main components of the images are analyzed by measuring spectral reflection factors of the collected images, each spectral reflection factor can be approximately described by vector coefficients of several kinds of main component vectors at the most.

The vector converting section 201 converts the image data output from the color scanner 101 into the vector coefficients.

For example, the vector converting section 201 determines a relationship between image data of a color sample read by the color scanner 101 and a vector coefficient obtained by measuring a spectral refection factor of the color sample beforehand, and determines the relationships with respect to many color samples. Then the relationships between the image data and the vector coefficients are approximated by the following Mathematical Formula (1). The vector converting section 201 applies Mathematical Formula (1) to the image data output from the color scanner 101. The image data converted into the vector coefficients (vector coefficient image data) are input to a color mapping section 202.

[Mathematical Formula (1)]

$$V_m = \sum_n a_{mn} \cdot S_n + a_{m0} \tag{1}$$

Where $S_n$ is an image data component output from the color scanner 101 and $1 \leq n \leq N$, $V_m$ is component estimation data of a vector coefficient and $1 \leq m \leq M$ ($\leq N$), $a_{mn}$ is a coefficient to the image data component of each component data set of the vector coefficients, and $a_{m0}$ is a constant of each component data set of the vector coefficients.

In this case, a spectral refection factor of the image data output from the color scanner 101 can be estimated from the component estimation data $V_m$ by using Mathematical Formula (2).

[Mathematical Formula (2)]

$$Rf = \sum_m r_m \cdot V_m + \bar{r} \tag{2}$$

Where $r_m$ is a main component vector of the spectral reflection factor, $\bar{r}$ is an average value vector of the spectral reflection factor, and Rf is an estimation value vector of the spectral reflection factor.

The color mapping section 202 converts the vector coefficient image data into L kinds of record image data corresponding to the color materials which are used in the color printer 102. The processes in the color mapping section 202 can be realized by a so-called M-dimensional LUT (lookup table) operation. An LUT is a table converting unit which converts image data into optimal record image data (high evaluation image data) under plural observing light sources. An M-dimensional LUT 203 is formed when a CPU (central processing unit) 205 executes a program stored in a ROM 204. The M-dimensional LUT 203 is described below in detail.

The record image data are input to the color printer 102 and the color printer 102 outputs the record image data on a recording sheet. A RAM 206, an HDD (hard disk drive) 207, and an I/O (input and output) controller 208 are connected to the CPU 205 via a bus. The RAM 206 temporarily stores data, the HDD 207 stores image data and so on, and the I/O controller 208 connects the microcomputer 103 to the keyboard 104, the mouse 105, and the display 106. The vector converting section 201 is connected to the CPU 205 via the bus and is controlled by the CPU 205.

Figure 3:
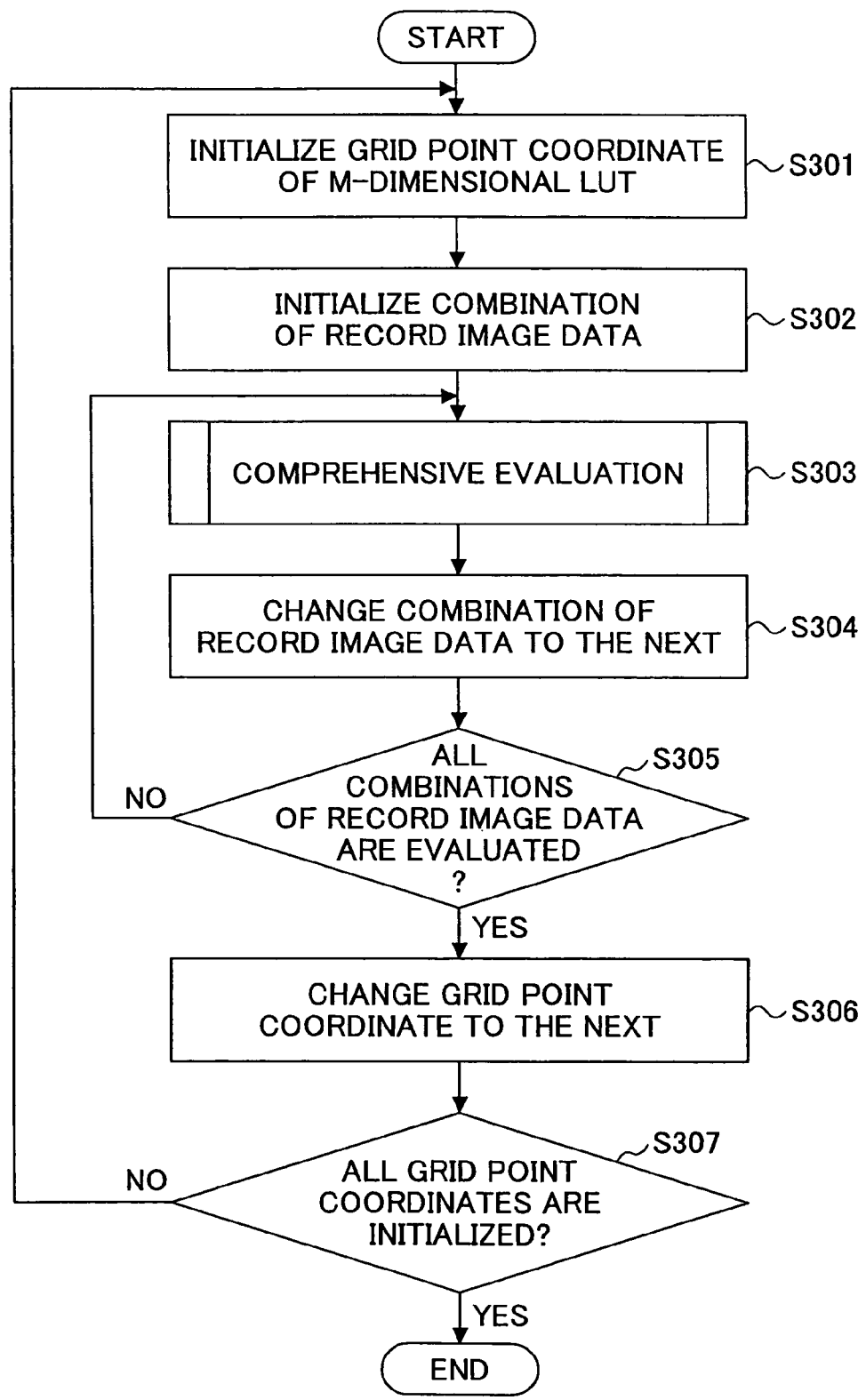
FIG. 3 is a flowchart showing processes for forming an M-dimensional LUT shown in FIG. 2.

Next, referring to FIG. 3, a forming method of the M-dimensional LUT 203 is described. FIG. 3 is a flowchart showing processes for forming the M-dimensional LUT 203.

First, a (vector coefficient) grid point coordinate of the M-dimensional LUT 203 is initialized (S301). Next, a combination of the record image data is initialized (S302). Then, a spectral difference between a combination of vector coefficients corresponding to the grid point coordinate and the combination of the record image data is comprehensively evaluated, and high evaluated record image data are temporarily stored (S303: comprehensive evaluation). The comprehensive evaluation is described below in detail.

Next, the combination of the record image data is changed to a next combination (S304). Then, it is determined whether all combinations of the record image data are evaluated (S305). When all combinations of the record image data are not evaluated (NO in S305), the process returns to S303, and repeats the processes S303 and S304 until all combinations of the record image data are evaluated. When all combinations of the record image data are evaluated (YES in S305); that is, when optimal record image data are selected, the combination of the record image data temporarily stored is stored as record image data corresponding to the grid point, and the (vector coefficient) grid point coordinate to be evaluated is changed to the next grid point coordinate (S306).

Next, it is determined whether all grid point coordinates are initialized (S307). When all grid point coordinates are not initialized (NO in S307), the process returns to S301, and the processes from S301 through S306 are repeated. When all grid point coordinates are initialized (YES in S307), the M-dimensional LUT 203 is formed.

Figure 4:
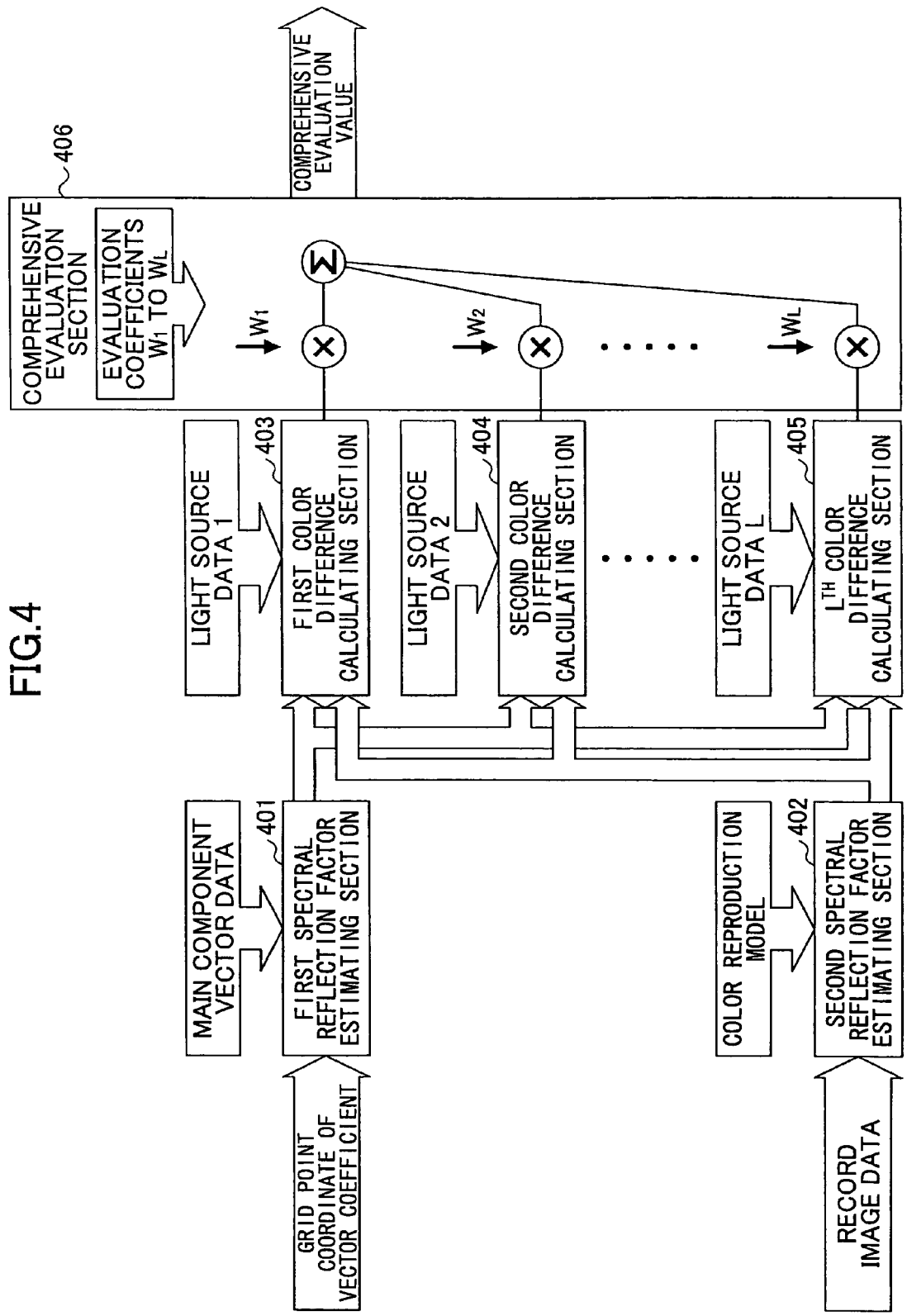
FIG. 4 is a diagram showing a process structure of a comprehensive evaluation shown in FIG. 3 according to the first embodiment of the present invention.

Next, referring to FIG. 4, the process in S303 (comprehensive evaluation) is described in detail. FIG. 4 is a diagram showing a process structure of the comprehensive evaluation in S303 shown in FIG. 3 according to the first embodiment of the present invention.

In FIG. 4, a first spectral reflection factor estimating section 401 calculates an estimation value vector of the spectral reflection factor Rf shown in Mathematical Formula (2) from a grid point coordinate of a vector coefficient and main component vector data.

In addition, a second spectral reflection factor estimating section 402 estimates a spectral reflection factor of a recording color based on record image data. As an example, an estimation method is described in which a color reproduction model called a mesh (halftone) model is used.

In the mesh model, record image data are shown by each mesh area ratio of each color material. In this, the following is assumed; that is, color materials are four kinds of materials cyan C, magenta M, yellow Y, and black K; and the corresponding mesh area ratios are c, m, y, and k, respectively ($0 \leq c, m, y, k \leq 1$). In the mesh model, meshes of color materials are randomly overlapped, and an area ratio at a part where color materials are overlapped is obtained by using the following Michel Mathematical Formula.

No Overlap $a_w = (1-c)(1-m)(1-y)(1-k)$

Only C Overlap $a_c = c(1-m)(1-y)(1-k)$

Only M Overlap $a_m = (1-c)m(1-y)(1-k)$

Only Y Overlap $a_y = (1-c)(1-m)y(1-k)$

Only K Overlap $a_k = (1-c)(1-m)(1-y)k$

C + M overlap $a_{cm} = cm(1-y)(1-k)$

C + Y Overlap $a_{cy} = c(1-m)y(1-k)$

C + K Overlap $a_{ck} = c(1-m)(1-y)k$ $\vdots \qquad \vdots$ $\vdots \qquad \vdots$ C + M + Y + K Overlap $a_{cmyk} = cmyk$ In addition, in the mesh model, when a spectral reflection factor of a part where the color materials are overlapped is defined as Ri (i=w, c, m, y, k, . . . , cmyk), the total spectral reflection factor R is obtained by Mathematical Formula (3).

[Mathematical Formula (3)]

$$R = \sum_i R_i \cdot a_i \qquad (3)$$

The method for estimating the spectral reflection factor from the record image data is not limited to the mesh model. That is, the mesh model is a relatively highly accurate estimation model in an area modulation type printer. However, a color reproduction model called a density model is suitable, for example, in a density modulation type printer. In addition, it is not always necessary to use a color reproduction model, and a multi-dimensional LUT which directly obtains a spectral reflection factor of a recording color from record image data can be used.

Returning to FIG. 4, a first color difference calculating section 403 calculates a color difference between the spectral reflection factors output from the first and second spectral reflection factor estimating sections 401 and 402 under light source data 1 which outputs spectral radiation luminance data. A second color difference calculating section 404 calculates a color difference between the spectral reflection factors output from the first and second spectral reflection factor estimating sections 401 and 402 under light source data 2 which outputs spectral radiation luminance data. An $L^{th}$ color difference calculating section 405 calculates a color difference between the spectral reflection factors output from the first and second spectral reflection factor estimating sections 401 and 402 under light source data L which outputs spectral radiation luminance data.

That is, first, tristimulus values X, Y, and Z are calculated from the spectral reflection factor R and the spectral radiation luminance data L(I) of the light source I by using Mathematical Formula (4).

[Mathematical Formula (4)]

$$X = \sum_\lambda R_\lambda \cdot L_\lambda(I) \cdot \bar{x}\lambda$$
$$Y = \sum_\lambda R_\lambda \cdot L_\lambda(I) \cdot \bar{y}\lambda \quad (4)$$
$$Z = \sum_\lambda R_\lambda \cdot L_\lambda(I) \cdot \bar{z}\lambda$$

[Mathematical Formula (5)]

Where, (5)

$\bar{x}\lambda$, $\bar{y}\lambda$, and $\bar{z}\lambda$ are color-matching functions of ICE 1931. $\lambda$ is a frequency component when a spectral reflection factor is expressed by a discrete vector.

Next, the tristimulus values X, Y, and Z are converted into corresponding values in a CIELAB color space.

[Mathematical Formula (6)]

$$L^* = 116 \cdot f\left(\frac{Y}{X_n}\right) - 16 \quad (6)$$
$$a^* = 500\left\{f\left(\frac{X}{X_n}\right) - f\left(\frac{Y}{Y_n}\right)\right\}$$
$$b^* = 200\left\{f\left(\frac{Y}{Y_n}\right) - f\left(\frac{Z}{Z_n}\right)\right\}$$

Where

[Mathematical Formula (7)]

$$f\left(\frac{X}{X_n}\right) = \left\{\left(\frac{X}{X_n}\right)^{\frac{1}{3}}, \frac{X}{X_n} > 0.008856; 7.787\frac{X}{X_n} + \frac{16}{116}, \frac{X}{X_n} \leq 0.008856\right. \quad (7)$$

$f\left(\frac{Y}{Y_n}\right)$, and $f\left(\frac{Z}{Z_n}\right)$ are similar to the above.

[Mathematical Formula (8)]

$$X_n = \sum_\lambda L_\lambda(I) \cdot \bar{x}\lambda$$
$$Y_n = \sum_\lambda L_\lambda(I) \cdot \bar{y}\lambda \quad (8)$$
$$Z_n = \sum_\lambda L_\lambda(I) \cdot \bar{z}\lambda$$

Next, a color difference between a grid point coordinate of a vector coefficient and a recording color is calculated.

[Mathematical Formula (9)]

$$\Delta E^* = \{(L_c^* - L_t^*)^2 + (a_c^* - a_t^*)^2 + (b_c^* - b_t^*)^2\}^{\frac{1}{2}} \quad (9)$$

Where, $L_t^*$, $a_t^*$, and $b_t^*$ are grid point coordinates, and $L_c^*$, $a_c^*$, and $b_c^*$ are CIELAB coordinates of recording colors.

Returning to FIG. 4, the color differences calculated by the first, second, and the $L^{th}$ color difference calculating sections 403 through 405 are input to a comprehensive evaluation section 406. The comprehensive evaluation section 406 evaluates the color differences by applying weighting to each input color difference. Generally, even if every combination of record image data is evaluated, it is difficult (impossible) to find a recording color which matches a spectral reflection factor of a grid point coordinate. In this case, since a color difference to be perceived is different among observing light sources, an optimal combination is changed by evaluation of which light source is emphasized. Therefore, the comprehensive evaluation section 406 applies weightings to outputs from the color difference calculating sections 403 through 405 by using evaluation coefficients $W_1$, $W_2$, and $W_L$.

[Mathematical Formula (10)]

The comprehensive evaluation value is shown by Mathematical Formula (10).

$$\text{The comprehensive evaluation value} = \sum_I W_I \cdot \Delta E_I^* \quad (10)$$

Where, $\Delta E_1^*$ is a color difference at the $I^{th}$ light source.

In the above, the color difference is used; however, the embodiment of the present invention is not limited to the color difference. For example, as shown in Mathematical Formula (9'), a modified color difference can be used in which weighting is applied to a luminance difference.

[Mathematical Formula (9')]

$$\Delta E^* = \{4(L_c^* - L_t^*)^2 + (a_c^* - a_t^*)^2 + (b_c^* - b_t^*)^2\}^{\frac{1}{2}} \quad (9')$$

Next, a determining method of the evaluation coefficients $W_1$, $w_2$, and $W_L$ is described.

FIG. 5 is a diagram showing screens for determining an observing light source on the display 106. As shown in FIG. 5(a), a predetermined observing light source list 501 is displayed on a default screen; and "CIE STANDARD LIGHT SOURCE D50" and "HIGH COLOR RENDERING DAYLIGHT WHITE FLUORESCENT LAMP" are selected. That is, in an observing light source selecting area 502, a black circle shows a selected status and a white circle shows an unselected status. In FIG. 5, the types of the fluorescent lamps comply with JIS (Japanese Industrial Standard) Z8719. In the observing light source list 501, lighting devices are shown.

When a user clicks a circle in the observing light source selecting area 502 by using the mouse 105, the selection and the non-selection of a light source is changed by a toggle operation. For example, when the user clicks the black circles of "CIE STANDARD LIGHT SOURCE D50" and "HIGH COLOR RENDERING DAYLIGHT WHITE FLUORES- CENT LAMP" and clicks the white circles of "NORMAL DAYLIGHT FLUORESCENT LAMP" and "NORMAL WHITE FLUORESCENT LAMP", the screen shown in FIG. 5(a) is changed to a screen shown in FIG. 5(b), and "NORMAL DAYLIGHT FLUORESCENT LAMP" and "NORMAL WHITE FLUORESCENT LAMP" are selected.

The CPU 205 detects operations on the screen and controls displaying the screen. Therefore, the CPU 205 can obtain the selected status of the observing light sources, and can determined the evaluation coefficients $W_1$ through $W_L$ based on the selected light sources. For example, in case of the selection shown in FIG. 5(b), the evaluation coefficients for "NORMAL DAYLIGHT FLUORESCENT LAMP" and "NORMAL WHITE FLUORESCENT LAMP" are determined to be "1", and the evaluation coefficients for other light sources are determined to be "0".

With this, the color differences calculated by color difference calculating sections are evaluated by the same weighting under the normal daylight fluorescent lamp and the normal white fluorescent lamp, an optimal recording color (highly evaluated recording color) corresponding to a grid point coordinate of a vector coefficient can be determined. Therefore, in a case where observing light sources are changed when record image data are observed, a color to be perceived from the record image data can be effectively made to approximate an original color of original manuscript image data in the image processing apparatus.

In the above, two light sources are selected; however, in the present embodiment, for example, three light sources can be selected. In addition, even if one light source is selected, the present embodiment can be operated; however, in this case, the result is the same as that in the conventional case.

The kinds of the observing light sources to be selected are not limited to those shown in FIG. 5, and can be wider than those shown in FIG. 5. In addition, as the name of the observing light source, a product name or a type name of the observing light source can be used.

Second Embodiment

Instead of directly selecting observing light sources, the observing light sources can be indirectly selected by selecting an observing place.

In the second embodiment of the present invention, the structure of the image processing apparatus is the same as that shown in FIG. 1.

Figure 6:
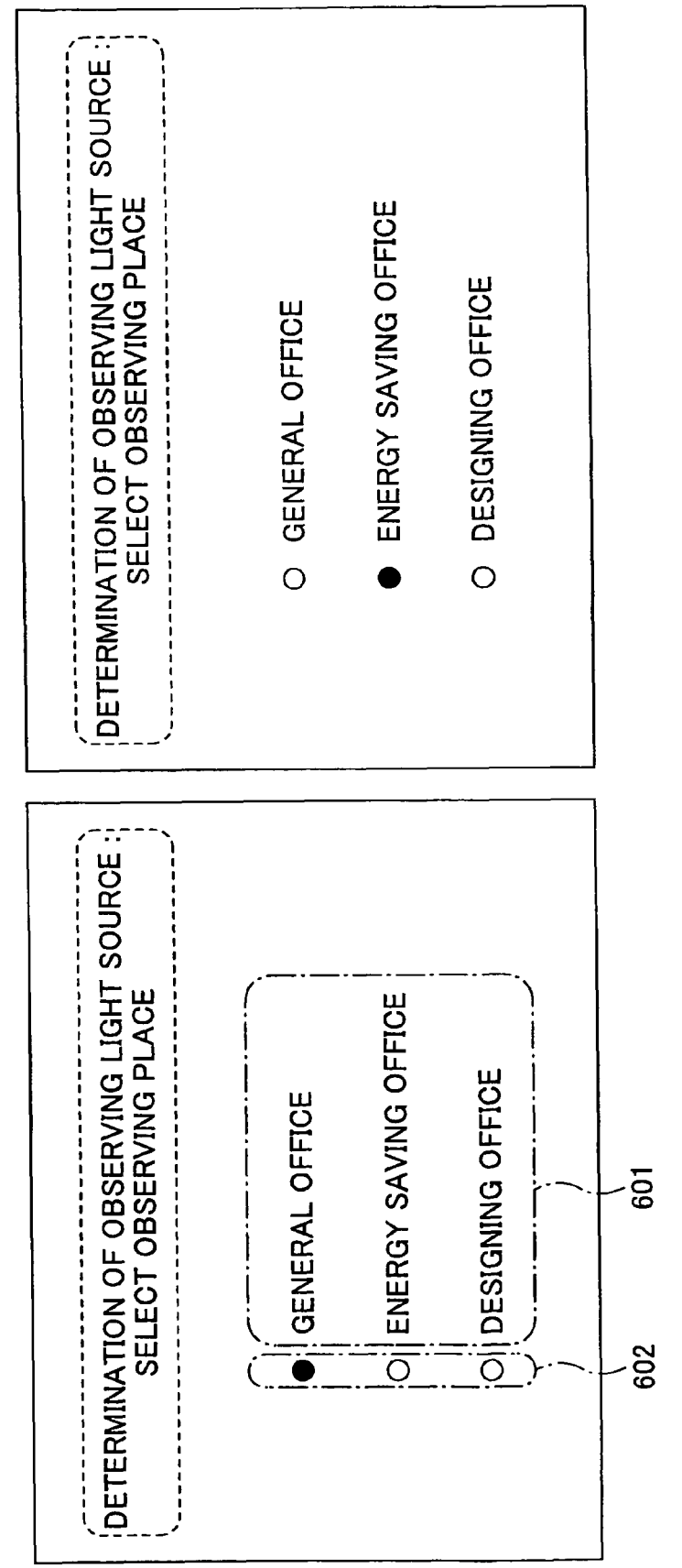
FIG. 6 is a diagram showing screens for determining an observing place on the display shown in FIG. 2 according to a second embodiment of the present invention.

FIG. 6 is a diagram showing screens for determining an observing place on the display 106.

As shown in FIG. 6(a), a predetermined observing place list 601 (office list) is displayed on a default screen; and a general office is selected. That is, in an observing place selecting area 602, a black circle shows a selected status and a white circle shows an unselected status.

When a user clicks a white circle in the observing place selecting area 602 by using the mouse 105, an observing place of the selected circle is determined. For example, when the user clicks on a white circle of an energy saving office shown in FIG. 6(a), as shown in FIG. 6(b), the energy saving office enters into the selected status and the general office enters into the unselected status.

The CPU 205 detects operations on the screen and controls displaying the screen. Therefore, the CPU 205 can obtain the selected status of the observing place, and can determine the evaluation coefficients $W_1$ through $W_L$ based on the selected observing place.

For example, as shown in FIG. 6(b), the energy saving office is selected, it is assumed that a high-efficiency type three-wavelength fluorescent lamp is used, the evaluation coefficients for the three-wavelength daylight fluorescent lamp and the three-wavelength daylight white fluorescent lamp are determined to be "1", and the evaluation coefficients for other light sources are determined to be "0".

In addition, in a case of a general office, it is assumed that a normal low-cost fluorescent lamp is used, the evaluation coefficients for the normal daylight fluorescent lamp and the normal white fluorescent lamp are determined to be "1", and the evaluation coefficients for other light sources are determined to be "0". Further, in a case of a designing office, it is assumed that a light source having high color rendering is used, the evaluation coefficients for the CIE standard light source D50 and the high color rendering daylight white fluorescent lamp are determined to be "1", and the evaluation coefficients for other light sources are determined to be "0".

As described above, according to the second embodiment of the present invention, plural observing light sources can be determined by an easy selection method with use of the observing place which can be easily understood without having specific technical knowledge. Therefore, when a light source is changed, a color to be perceived from record image data can be made to effectively approximate an original color of original manuscript image data in the image processing apparatus. Therefore, in a case where observing light sources are changed when record image data are observed, a color to be perceived from the record image data can be effectively approximated to an original color of original manuscript image data in the image processing apparatus.

In the second embodiment of the present invention, the observing places are not limited to the above, and the light sources corresponding to the observing places are not limited to the above.

Third Embodiment

Figure 7:
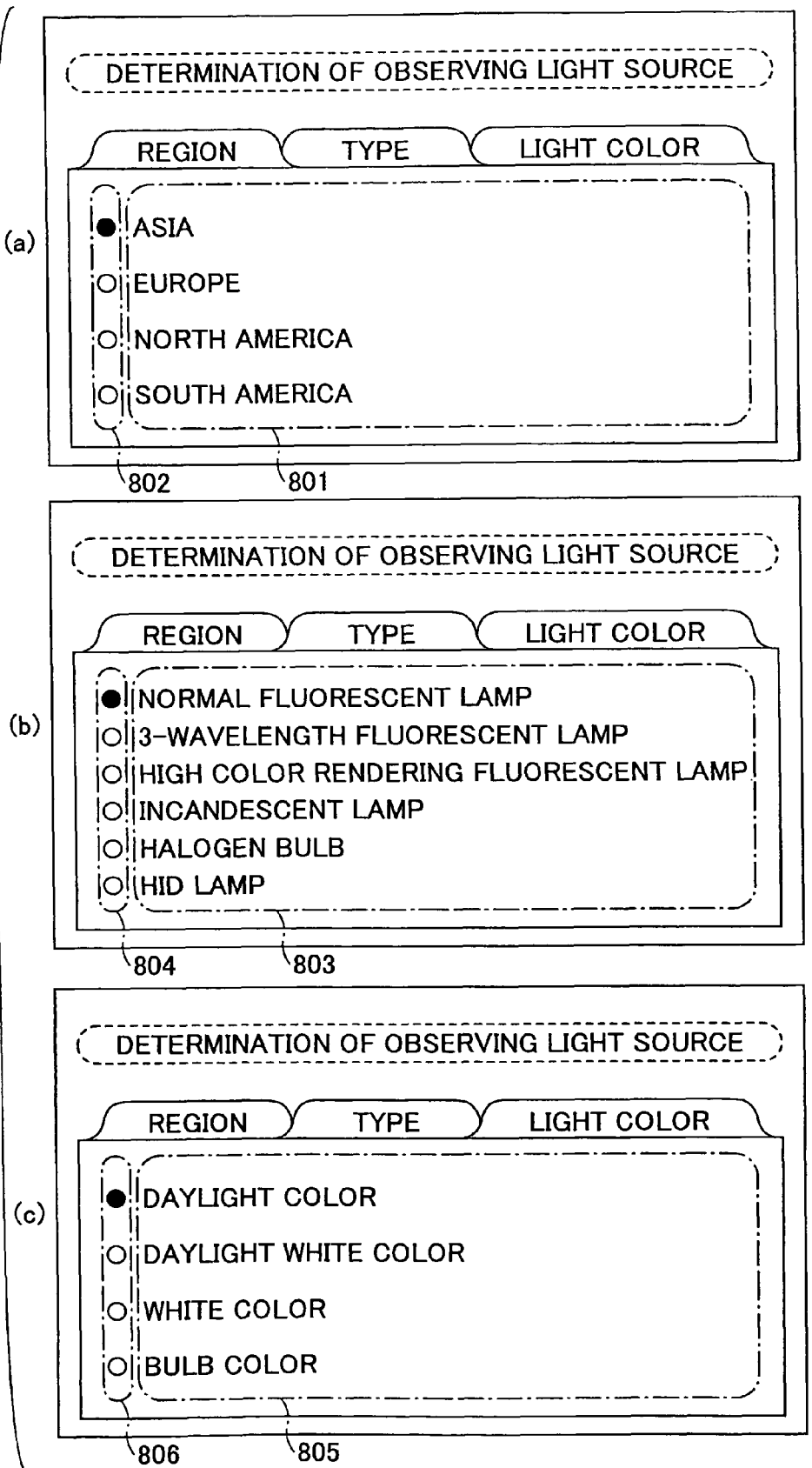
FIG. 7 is a diagram showing screens for determining an observing light source on the display shown in FIG. 2 according to a third embodiment of the present invention.

The observing light sources can be indirectly determined by using other factors in addition to the observing places. FIG. 7 is a diagram showing screens for determining an observing light source on the display 106.

In the third embodiment of the present invention, the structure of the image processing apparatus is the same as that shown in FIG. 1.

As shown in FIG. 7, an observing light source determination screen (screen of determination of observing light source) has three tabs, namely a region tab, a type tab, and a light color tab. When a user clicks one of the three tabs by using the mouse 105, the clicked tab is selected.

In FIG. 7(a), the region tab is selected, and a predetermined region list 801 is displayed. In a region selecting area 802, a black circle shows a selected status and a white circle shows an unselected status, and "ASIA" is selected as the region in this case. When a user clicks a white circle in the region selecting area 802 by using the mouse 105, the clicked region is selected.

In FIG. 7(b), the type tab is selected, and a predetermined type list 803 is displayed. In a type selecting area 804, a black circle shows a selected status and a white circle shows an unselected status, and "NORMAL FLUORESCENT LAMP" is selected as the type in this case. When a user clicks a white circle in the type selecting area 804 by using the mouse 105, the clicked type is selected.

In FIG. 7(c), the light color tab is selected, and a predetermined light color list 805 is displayed. In a light color selection area 806, a black circle shows a selection and a white circle shows a non-selection, and "DAYLIGHT COLOR" is selected as the light color in this case. When a user clicks a white circle in the light color selecting area 806 by using the mouse 105, the clicked type is selected. The light colors are different among the types of the light sources; therefore, the light colors are shown by the selected type of the light source.

The CPU 205 detects operations on the screen and controls displaying the screen. Therefore, the CPU 205 can obtain the selected status of the region, the type, and the light color, and can determine the evaluation coefficients $W_1$ through $W_L$ based on the selected status of the region, the type, and the light color. In addition, the CPU 205 can change the light source data 1 though L.

Generally, light sources to be used for observing the record image data are different among regions such as continents, nations, states, and so on. However, in the third embodiment of the present invention, since a region can be selected, an observing light source which is assumed to be actually used in the region can be suitably determined.

In addition, actually, the number of the types of the light sources is great and the number of the light colors of the light source is great. However, in the third embodiment of the present invention, since the type and the light color can be separately selected, that is, the light color can be selected after selecting the type and vice versa, operability is increased and errors may be decreased. With this, an observing light source which is assumed to be actually used can be suitably determined. In FIG. 7, the regions, the types, and the light colors are examples, and can be arbitrarily determined.

Fourth Embodiment

In S303 (comprehensive evaluation) shown in FIG. 3, the combinations of the record image data are determined based on the color difference between the grid point coordinates of the vector coefficients and the recording color. However, in this case, when the grid point coordinate of the vector coefficient is within the color reproduction range of the color printer 102 under the group of the light sources, only the influence of the light sources influences the color difference. Therefore, a relatively good result can be obtained.

However, when the grid point coordinate of the vector coefficient is outside the color reproduction range of the color printer 102, a color difference generated from non-reproduction of the image is absolutely added to the original color difference. In this case, in addition to only a simple color difference between two colors, a relationship among surrounding colors including colors within the color reproduction range when the light source is changed becomes important.

FIG. 8 is a diagram showing a process structure of the comprehensive evaluation in S303 shown in FIG. 3 according to the fourth embodiment of the present invention. In FIG. 8, when an element is similar to or the same as that shown in FIG. 4, the same reference number as that shown in FIG. 4 is used for the element, and the same description as that shown in FIG. 4 is omitted.

As shown in FIG. 8, a first color difference, luminance, hue, color saturation calculating section 703 calculates a color difference, a luminance difference, a hue difference, and a color saturation difference between the input spectral reflection factors under light source data 1 which outputs the spectral radiation luminance data. A second color difference, luminance, hue, color saturation calculating section 704 calculates a color difference, a luminance difference, a hue difference, and a color saturation difference between the input spectral reflection factors under light source data 2 which outputs the spectral radiation luminance data. An $L^{th}$ color difference, luminance, hue, color saturation calculating section 705 calculates a color difference, a luminance difference, a hue difference, and a color saturation difference between the input spectral reflection factors under light source data L which outputs the spectral radiation luminance data.

Since the CIELAB coordinate and the color difference have been calculated above, the description of the calculation is omitted. The luminance difference between the grid point coordinate of the vector coefficient and the record image data is calculated by Mathematical Formula (11).

[Mathematical Formula (11)]

$$\Delta L^* = L_c^* - L_t^* \tag{11}$$

Similarly, the color saturation difference is calculated by Mathematical Formula (12).

[Mathematical Formula (12)]

$$\Delta S^* = S_c^* - S_t^* \tag{12}$$

Where $S_c^*$ and $S_t^*$ are shown in Mathematical Formula (13).

[Mathematical Formula (13)]

$$S_c^* = (a_c^{*2} + b_c^{*2})^{\frac{1}{2}} \tag{13}$$
$$S_t^* = (a_t^{*2} + b_t^{*2})^{\frac{1}{2}}$$

In addition, the hue difference is calculated by Mathematical Formula (14).

[Mathematical Formula (14)]

$$\Delta H^* = \left\{ (\Delta E^{*2} - \Delta L^{*2} - \Delta S^{*2})^{\frac{1}{2}}, \right. \tag{14}$$
$$H_c^* - H_t^* \geq 0; -(\Delta E^{*2} - \Delta L^{*2} - \Delta S^{*2}), H_c^* - H_t^* < 0$$

where $H_c^*$, and $H_t^*$ are shown in Mathematical Formula (15).

[Mathematical Formula (15)]

$$H_c^* = \mathrm{atan}\, 2(a_c^*, b_c^*)$$

$$H_t^* = \mathrm{atan}\, 2(a_t^*, b_t^*) \tag{15}$$

Next, the color differences calculated by the color difference, luminance, hue, color saturation calculating sections 703 through 705 are input to a color difference evaluating section 706. Similarly, the luminance differences, the hue differences, and the color saturation differences are input to a luminance, hue, color saturation evaluating section 707. Similar to the comprehensive evaluation section 406 shown in FIG. 4, the color difference evaluating section 706 evaluates the color differences by applying weightings to the received color differences.

The luminance, hue, color saturation evaluating section 707 comprehensively evaluates the dispersion of the luminance differences, the hue differences, and the color saturation differences by applying weightings to the received differences. For example, the dispersion is evaluated by obtaining the standard deviations of the weighted luminance difference, the weighted hue difference, and the weighted color saturation difference.

That is, the standard deviations of the weighted luminance difference, the weighted hue difference, and the weighted color saturation difference are calculated by using Mathematical Formula (16).

$$\alpha_{\Delta L} = \sqrt{\frac{\sum_I W_I \cdot \Delta L_I^2 - \left(\sum_I W_I \cdot \Delta L_I\right)^2 / \sum_I W_I}{\sum_I W_I}}$$

$$\alpha_{\Delta H} = \sqrt{\frac{\sum_I W_I \cdot \Delta H_I^2 - \left(\sum_I W_I \cdot \Delta H_I\right)^2 / \sum_I W_I}{\sum_I W_I}}$$

$$\alpha_{\Delta S} = \sqrt{\frac{\sum_I W_I \cdot \Delta S_I^2 - \left(\sum_I W_I \cdot \Delta S_I\right)^2 / \sum_I W_I}{\sum_I W_I}}$$

(16)

A comprehensive evaluation section 708 obtains a comprehensive evaluation value based on a color difference comprehensive evaluation value output from the color difference evaluating section 706 and a dispersion evaluation value of the luminance difference, the hue difference, and the color saturation difference output from the luminance, hue, color saturation evaluating section 707.

When the above dispersion is evaluated in the same level, the comprehensive evaluation value is shown in Mathematical Formula (17).

[Mathematical Formula (17)]

Comprehensive Evaluation Value=Comprehensive Evaluation Value of Mathematical Formula (10)+ $\alpha_{\Delta L} + \alpha_{\Delta H} + \alpha_{\Delta S}$ (17)

With this, record image data to be perceived can be made to approximate an original manuscript image when a light source for observing the record image data is changed. That is, a relationship between a target color and colors surrounding the target color including colors within the color reproduction range can be maintained in good condition in the image processing apparatus.

The comprehensive evaluation value is not limited to Mathematical Formula (17). For example, weighting is applied only to a parts or only to the color difference comprehensive evaluation value and the dispersion of the luminance difference, and the comprehensive evaluation value is obtained. That is, Mathematical Formula (17') shows a case in which the color difference comprehensive evaluation value and the dispersion of the luminance difference are used.

[Mathematical Formula (17')]

Comprehensive Evaluation Value=Comprehensive Evaluation Value of Mathematical Formula (10)+ $\alpha_{\Delta L}/2$ (17')

In the above, light sources to be selected are evaluated as the same level; however, for example, it can be determined that a light source is a primary light source and another light source is a secondary light source. In this case, the evaluation coefficient of the primary light source is determined to be "1", the evaluation coefficient of the secondary light source is determined to be "0.5", and the evaluation coefficient of the other light sources is determined to be "0". With this, the evaluation can be performed at conditions near an actual situation; therefore, a color to be perceived can be made to approximate an original color when the light source is changed.

In the above, the image processing apparatus formed of plural units such as the color scanner 101, the color printer 102, the microcomputer 103, and so on is described. The embodiments of the present invention can be applied to a single apparatus, for example, a copying machine, or a facsimile machine.

In addition, in the above, the image processing apparatus is described; however, the embodiments of the present invention can be realized as an image processing method, or a program for executing the image processing method, or a recording medium storing the program.

Further, the present invention is not limited to the specifically disclosed embodiments, and variations and modifications may be made without departing from the scope of the present invention.

The present invention is based on Japanese Priority Patent Application No. 2007-322319, filed on Dec. 13, 2007, with the Japanese Patent Office, the entire contents of which are hereby incorporated herein by reference.

What is claimed is:

1. An image processing apparatus, comprising:
   an input unit which inputs image data of a manuscript image by reading the manuscript image with use of N (N≧4) kinds of spectral sensitivity characteristics;
   a converting unit which converts the image data into record image data formed of L (L≧4) kinds of components;
   an output unit which outputs a record image based on the record image data;
   a light source determining unit which determines a plurality of light sources under which the manuscript image and the record image are observed; and
   a control unit which converts the image data into optimal record image data based on color differences between the manuscript image and the record image under the determined plural light sources under which the manuscript image and the record image are observed.

2. The image processing apparatus as claimed in claim 1, wherein:
   the light source determining unit includes
   a light source name displaying unit which displays names of the corresponding light sources under which the manuscript image and the record image are observed; and
   a light source name selecting unit by which a user selects one or more of the displayed names of the light sources; wherein
   the light source determining unit determines the light sources of the selected names.

3. The image processing apparatus as claimed in claim 1, wherein:
   the light source determining unit includes
   an observing place displaying unit which displays places where the manuscript image and the record image are observed; and
   an observing place selecting unit by which a user selects a place where the manuscript image and the record image are observed; wherein
   the light source determining unit determines one or more of the light sources of the selected place.

4. The image processing apparatus as claimed in claim 1, wherein:
   the light source determining unit includes
   a setting region displaying unit which displays regions where the image processing apparatus is set; and
   a setting region selecting unit by which a user selects a region where the image processing apparatus is set; wherein the light source determining unit determines one or more of the light sources based on the selected region.

5. The image processing apparatus as claimed in claim 1, wherein:
the light source determining unit includes
a lighting device displaying unit which displays lighting devices for lighting the manuscript image and the record image; and
a lighting device selecting unit by which a user selects one or more of the lighting devices; wherein
the light source determining unit determines one or more of the light sources based on the selected lighting devices.

6. The image processing apparatus as claimed in claim 1, wherein: the control unit includes
a first estimating unit which estimates a spectral reflection factor of the manuscript image;
a second estimating unit which estimates a spectral reflection factor of the record image;
a first calculating unit which calculates a first color difference based on spectral radiation luminance of a first light source and the estimated spectral reflection factors of the manuscript image and the record image;
a second calculating unit which calculates a second color difference based on spectral radiation luminance of a second light source and the estimated spectral reflection factors of the manuscript image and the record image; and
a comprehensive evaluation unit which evaluates the spectral reflection factor of the record image for the spectral reflection factor of the manuscript image based on the first and second color differences; wherein
the control unit converts the image data into the record data highly evaluated by the comprehensive evaluation unit.

7. The image processing apparatus as claimed in claim 6, wherein:
the comprehensive evaluation unit evaluates the spectral reflection factor of the record image for the spectral reflection factor of the manuscript image by applying weightings to the first and second color differences corresponding to the determined first and second light sources.

8. The image processing apparatus as claimed in claim 1, wherein: the control unit includes
a first estimating unit which estimates a spectral reflection factor of the manuscript image;
a second estimating unit which estimates a spectral reflection factor of the record image;
a third calculating unit which calculates at least one of a first luminance difference, a first hue difference, and a first color saturation difference based on spectral radiation luminance of a first light source and the estimated spectral reflection factors of the manuscript image and the record image;
a fourth calculating unit which calculates at least one of a second luminance difference, a second hue difference, and a second color saturation difference based on spectral radiation luminance of a second light source and the estimated spectral reflection factors of the manuscript image and the record image; and
a comprehensive evaluation unit which evaluates the spectral reflection factor of the record image for the spectral reflection factor of the manuscript image based on at least one of the first and second luminance differences, the first and second hue differences, and the first and second color saturation differences; wherein
the control unit converts the image data into the record data highly evaluated by the comprehensive evaluation unit.

9. The image processing apparatus as claimed in claim 8 wherein:
the comprehensive evaluation unit evaluates the spectral reflection factor of the record image for the spectral reflection factor of the manuscript image by applying weightings to at least one of the first and second luminance differences, the first and second hue differences, and the first and second color saturation differences corresponding to the determined first and second light sources.

10. An image processing method, comprising:
an input step which inputs image data of a manuscript image by reading the manuscript image with use of N ($N \geq 4$) kinds of spectral sensitivity characteristics;
a converting step which converts the image data into record image data formed of L ($L \geq 4$) kinds of components;
an output step which outputs a record image based on the record image data;
a light source determining step which determines a plurality of light sources under which the manuscript image and the record image are observed; and
a control step which converts the image data into optimal record image data based on color differences between the manuscript image and the record image under the determined plural light sources under which the manuscript image and the record image are observed.

11. The image processing method as claimed in claim 10, wherein:
the light source determining step includes
a light source name displaying step which displays names of the corresponding light sources under which the manuscript image and the record image are observed; and
a light source name selecting step by which a user selects one or more of the displayed names of the light sources; wherein
the light source determining step determines the light sources of the selected names.

12. The image processing method as claimed in claim 10, wherein:
the light source determining step includes
an observing place displaying step which displays places where the manuscript image and the record image are observed; and
an observing place selecting step by which a user selects a place where the manuscript image and the record image are observed; wherein
the light source determining step determines one or more of the light sources of the selected place.

13. The image processing method as claimed in claim 10, wherein:
the light source determining step includes
a setting region displaying step which displays regions where the image processing apparatus is set; and
a setting region selecting step by which a user selects a region where the image processing apparatus is set; wherein
the light source determining step determines one or more of the light sources based on the selected region.

14. The image processing method as claimed in claim 10, wherein:
the light source determining step includes
a lighting device displaying step which displays lighting devices for lighting the manuscript image and the record image; and
a lighting device selecting step by which a user selects one or more of the lighting devices; wherein the light source determining step determines one or more of the light sources based on the selected lighting devices.

15. The image processing method as claimed in claim 10, wherein:

the control step includes a first estimating step which estimates a spectral reflection factor of the manuscript image;

a second estimating step which estimates a spectral reflection factor of the record image;

a first calculating step which calculates a first color difference based on spectral radiation luminance of a first light source and the estimated spectral reflection factors of the manuscript image and the record image;

a second calculating step which calculates a second color difference based on spectral radiation luminance of a second light source and the estimated spectral reflection factors of the manuscript image and the record image; and a comprehensive evaluation step which evaluates the spectral reflection factor of the record image for the spectral reflection factor of the manuscript image based on the first and second color differences; wherein the control step converts the image data into the record data highly evaluated by the comprehensive evaluation step.

16. The image processing method as claimed in claim 15, wherein:

the comprehensive evaluation step evaluates the spectral reflection factor of the record image for the spectral reflection factor of the manuscript image by applying weightings to the first and second color differences corresponding to the determined first and second light sources.

17. The image processing method as claimed in claim 10, wherein:

the control step includes a first estimating step which estimates a spectral reflection factor of the manuscript image;

a second estimating step which estimates a spectral reflection factor of the record image;

a third calculating step which calculates at least one of a first luminance difference, a first hue difference, and a first color saturation difference based on spectral radiation luminance of a first light source and the estimated spectral reflection factors of the manuscript image and the record image;

a fourth calculating step which calculates at least one of a second luminance difference, a second hue difference, and a second color saturation difference based on spectral radiation luminance of a second light source and the estimated spectral reflection factors of the manuscript image and the record image; and a comprehensive evaluation step which evaluates the spectral reflection factor of the record image for the spectral reflection factor of the manuscript image based on at least one of the first and second luminance differences, the first and second hue differences, and the first and second color saturation differences; wherein the control step converts the image data into the record data highly evaluated by the comprehensive evaluation step.

18. The image processing method as claimed in claim 17 wherein:

the comprehensive evaluation step evaluates the spectral reflection factor of the record image for the spectral reflection factor of the manuscript image by applying weightings to at least one of the first and second luminance differences, the first and second hue differences, and the first and second color saturation differences corresponding to the determined first and second light sources.

19. A non-transitory computer-readable recording medium storing an image processing program, wherein:

the image processing program includes an input step which inputs image data of a manuscript image by reading the manuscript image with use of N (N≧4) kinds of spectral sensitivity characteristics;

a converting step which converts the image data into record image data formed of L (L≧4) kinds of components;

an output step which outputs a record image based on the record image data;

a light source determining step which determines a plurality of light sources under which the manuscript image and the record image are observed; and a control step which converts the image data into an optimal record image data based on color differences between the manuscript image and the record image under the determined plural light sources under which the manuscript image and the record image are observed.

20. The non-transitory computer-readable recording medium storing the image processing program as claimed in claim 19, wherein:

the light source determining step in the image processing program includes a light source name displaying step which displays names of the corresponding light sources under which the manuscript image and the record image are observed; and a light source name selecting step by which a user selects one or more of the displayed names of the light sources; wherein the light source determining step determines the light sources of the selected names.

* * * * *